US012220694B2

(12) United States Patent
Keller et al.

(10) Patent No.: US 12,220,694 B2
(45) Date of Patent: Feb. 11, 2025

(54) PIPETTING DEVICE AND METHOD

(71) Applicant: TECAN TRADING AG, Mannedorf (CH)

(72) Inventors: Michael Keller, Zurich (CH); Thomas Geiges, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 831 days.

(21) Appl. No.: 17/122,470

(22) Filed: Dec. 15, 2020

(65) Prior Publication Data

US 2021/0187493 A1 Jun. 24, 2021

(30) Foreign Application Priority Data

Dec. 18, 2019 (EP) .................................... 19217577

(51) Int. Cl.
*B01L 3/02* (2006.01)

(52) U.S. Cl.
CPC ......... *B01L 3/021* (2013.01); *B01L 2200/147* (2013.01); *B01L 2300/14* (2013.01); *B01L 2300/1888* (2013.01); *B01L 2400/0487* (2013.01); *B01L 2400/06* (2013.01)

(58) Field of Classification Search
CPC ............... B01L 3/021; B01L 2200/147; B01L 2300/14; B01L 2300/1888; B01L 2400/0487; B01L 2400/06; B01L 2200/148
See application file for complete search history.

(56) References Cited

U.S. PATENT DOCUMENTS

| | | | | |
|---|---|---|---|---|
| 5,895,838 | A * | 4/1999 | Harjunmaa | G01F 11/027 73/864.13 |
| 6,232,129 | B1 * | 5/2001 | Wiktor | B01L 3/0268 422/417 |
| 9,821,305 | B2 | 11/2017 | Michels et al. | |
| 9,824,873 | B2 * | 11/2017 | Brekenfeld | C03B 19/12 |
| 2005/0022593 | A1 * | 2/2005 | Franz | G01F 1/6845 73/204.26 |
| 2005/0196304 | A1 * | 9/2005 | Richter | B01L 3/02 417/412 |

(Continued)

FOREIGN PATENT DOCUMENTS

| | | | |
|---|---|---|---|
| CN | 202629464 | U | 12/2012 |
| DE | 102010013410 | A1 | 8/2010 |

(Continued)

*Primary Examiner* — Giovanni Astacio-Oquendo
*Assistant Examiner* — Dilara Sultana
(74) *Attorney, Agent, or Firm* — Notaro, Michalos & Zaccaria P.C.

(57) ABSTRACT

Pipetting device for pipetting a liquid driven by a gaseous working medium, the pipetting device having at least one pipette connector adapted to attach a pipette at a connection opening at least one pressurizing and/or suctioning pressure source, a gas flow connection between said connection opening and at least one pressure source, a flow restriction defining at least a section of said gas flow connection, a first sensor configured to measure a quantity indicative of the temperature of the flow restriction. The invention is further directed to a gas flow connection element for a pipetting device and to a method of pipetting a liquid volume.

20 Claims, 4 Drawing Sheets

(56) References Cited

U.S. PATENT DOCUMENTS

| | | | | |
|---|---|---|---|---|
| 2008/0044311 | A1* | 2/2008 | Iguchi | G01N 35/1009 422/63 |
| 2011/0108126 | A1 | 5/2011 | Monkowski et al. | |
| 2012/0174992 | A1* | 7/2012 | Shajii | G05D 7/0635 137/486 |
| 2012/0295312 | A1* | 11/2012 | Seo | B01L 7/5255 435/91.2 |
| 2017/0203511 | A1* | 7/2017 | Burkhart | B22F 7/04 |
| 2019/0321815 | A1* | 10/2019 | Schmid | G01N 35/1072 |
| 2019/0388887 | A1* | 12/2019 | Le Berre | B01L 7/52 |

FOREIGN PATENT DOCUMENTS

| | | | | |
|---|---|---|---|---|
| EP | 2412439 | A1 | 2/2012 | |
| EP | 2623202 | A1 | 8/2013 | |
| KR | 20170043376 | A * | 4/2017 | |
| WO | WO2009/035981 | A1 | 3/2009 | |
| WO | WO-2019110655 | A1 * | 6/2019 | F24S 60/00 |

* cited by examiner

PIPETTING DEVICE AND METHOD

The invention addressed herein relates to a pipetting device, more specifically to a pipetting device for pipetting a liquid driven by a gaseous working medium. Under further aspects, the invention relates to a gas flow connection element for a pipetting device and to a method of pipetting a liquid volume.

In the field of liquid handling, it is common practice to use pipettes to aspirate and dispense a liquid. Such a liquid may e.g. be a chemical product or a sample of a bodily fluid. One type of pipetting devices is the so-called air displacement pipette. When using this type of pipette, a defined volume of a gaseous working medium, in typical cases air, is loaded into the pipette or removed from the pipette. Thereby a pressure on one side of the liquid in the pipette or adjacent to an opening of the pipette is decreased or increased with respect to reference pressure, such that a force results, which drives the liquid out of the pipette or into the pipette. We understand throughout the present description and claims under "a pipette" a tubular member with one opening for aspiration and release of a liquid product dose and in addition, with a second opening. The second opening can be brought in contact with the gaseous working medium having under-pressure to achieve aspirating of a liquid through the first opening or can be brought in contact with the gaseous medium having over-pressure to achieve dispensing of a liquid from the inside of the pipette through the first opening. Under-pressure and over-pressure are defined in relation to an ambient pressure and can be applied in a controlled way.

In fields as for example pharmaceutical research, clinical diagnostics and quality assurance, highly automated facilities for the handling, processing and analyzing of liquids are in use. In such facilities, pipetting devices often play a central role in producing liquid doses of a predetermined amount and in transporting doses of liquid between different stations for processing or for analyzing the liquid. Accuracy and precision of the produced liquid doses is of large importance. In general, rapid processing is desired. This can be achieved by parallel handling of liquid doses or by applying fast repetition rates. Furthermore, it is important to keep accuracy and precision over extended time on a high level, in particular in long sequences of similar pipetting operations, pipetting operations performed in the beginning of the sequence should not lead to different results than pipetting operation performed at the end of the sequence. Liquid doses produced with individual pipette tips of the same type and nominal dimension should only have minimal variance.

EP 2 412 439 A1 discloses a pipetting device having a flow restriction in the path of a gaseous working medium, which flow restriction is dimensioned such that the flow resistance of the working medium in the flow restriction is significantly lower than the flow resistance of the liquid passing the opening of the pipette. This leads to a reduction of the susceptibility to variations of the pipette tips, e.g. to variations in the exact diameter of the orifice of the pipette tips.

The object of the present invention is to provide an alternative pipetting device for pipetting a liquid driven by a gaseous working medium. A further object of the invention is to provide a device and a method, which improve at least one of accuracy, precision and temporal stability of pipetting, i.e. at least one of aspirating or dispensing, a liquid driven by a gaseous working medium.

This object is achieved by a pipetting device according to claim 1. The pipetting device according to the invention is a pipetting device for pipetting a liquid driven by a gaseous working medium.

The pipetting device comprises at least one pipette connector adapted to attach a pipette at a connection opening.

The pipetting device comprises at least one pressurizing and/or suctioning pressure source. For example, a single piston pump may be used to create over-pressure for dispensing and under-pressure for aspirating. By using valves establishing selectively a fluid connection to a high-pressure side or a low-pressure side of a rotary pump, single pressure source may be the pressurizing pressure source as well as the suctioning pressure source. Alternatively, a pressure tank and a vacuum tank may be provided as separate pressurizing pressure source and as suctioning pressure source, respectively.

The pipetting device comprises a gas flow connection between said connection opening and said at least one pressure source.

The pipetting device comprises a flow restriction defining at least a section of said gas flow connection. This way, the flow restriction divides the gas flow connection in an upstream section and a downstream section with respect to the flow restriction. The flow restriction defines a flow resistance for the gaseous medium crossing the flow restriction.

The pipetting device comprises a first sensor configured to measure a quantity indicative of the temperature of the flow restriction. This first sensor may e.g. be an electrical resistor having an electrical resistance depending on the temperature, as e.g. an PT-100 or a PT-1000 resistor. In this case, the quantity is the electrical resistance. This quantity can be converted into a temperature value. The first sensor, in the previous example the resistor, is mounted in proximity or in thermal contact to the flow restriction, such that the temperature of the resistor always stays close to the temperature of the walls of the flow resistance, which walls are in contact with the gaseous medium.

The inventors have recognized that the temperature of the flow resistance in a pipetting device of the kind described, significantly influences the amount of gaseous working medium passing the flow restriction per time. Surprisingly, with the help of the first sensor, the amount of gaseous working medium passing the flow resistance per time can be predicted with significantly increased accuracy. This leads in turn to higher accuracy in the liquid volumes pipetted by driving a liquid by means of the gaseous working medium.

The inventors have noticed that a similar accuracy cannot be achieved by keeping the temperature of the inflowing gaseous medium constant or by measuring the temperature of the gaseous medium before it reaches the flow restriction and using this measured temperature to predict the amount of gaseous working medium passing the flow resistance per time.

Embodiments of the pipetting device according to the invention are defined by features recited in claims 2 to 10.

In one embodiment of the pipetting device according to the invention, which may be combined with any of the embodiments still to be addressed unless in contradiction, the pipetting device further comprises a time controller operatively connected to a controllable valve, which controllable valve is configured to selectively open or interrupt the gas flow connection in a time-controlled manner.

The inventors have recognized that with the increased precision reached in predicting the amount of gaseous working medium passing the flow resistance per time, an open loop control of the opening time of the gas flow connection is sufficient to achieve acceptable precision in the pipetted volumes. This is particularly useful for pipetting volumes in the range of 0.1 microliters to 5000 microliters. A relative precision (Coefficient of Variation, CV) of pipetted volumes below 10 microliters of 2.5% CV or lower, in particular of 0.5% or lower, is achievable with the present invention for a pipetting volume of 10 to 5000 microliters. The closing signal can be sent to the controllable valve purely based on the time elapsed and without any need to wait for measured signals, e.g. from a flow sensor, to be evaluated. The opening time of the controllable valve may be calculated in advance, i.e. before sending the opening signal to the controllable valve.

In one embodiment of the pipetting device according to the invention, which may be combined with any of the preaddressed embodiments and any of the embodiments still to be addressed unless in contradiction, the pipetting device further comprises a heat storage block, wherein the flow restriction is formed by an inner wall of the heat storage block or wherein the flow restriction is formed by a flow restriction element embedded in the heat storage block, and wherein the first sensor is a temperature sensor thermally connected to the heat storage block.

The inventors have recognized that a pipetting device comprising a heat storage block as defined above, displays increased temporal stability of the pipetted volumes. In particular, systematic drifts of the deviation between a requested volume and an effectively pipetted volume in a longer pipetting sequence are avoided by surprisingly simple means.

In one alternative of the embodiment, an inner wall of the heat storage block directly forms the flow restriction. E.g. a hole drilled directly into the heat storage block may form the flow restriction. This alternative has the advantage that the inner wall is thermally well connected to the heat storage block. For higher flow rates, where very small diameters of the flow restriction are not needed, this alternative may be the solution to choose.

In a second alternative of the embodiment, a flow restriction element separate from the heat storage block may form the flow restriction. The flow restriction element, which may e.g. be a capillary, is embedded into the heat storage block. This second alternative has the advantage that a flow restriction of very small inner diameter or cross section may be achieved by using a prefabricated flow restriction element. For very low flow rates, highest precision may be achieved according to this second alternative.

In one embodiment of the pipetting device according to the invention, which may be combined with any of the preaddressed embodiments and any of the embodiments still to be addressed unless in contradiction, the heat storage block comprises a metal, in particular wherein the heat storage block comprises sintered metal, in particular, wherein the heat storage block consists of a monolithic sintered metal structure.

The heat storage block of this embodiment effectively protects the flow restriction against temperature fluctuations stemming from the ambient or from neighboring elements of the pipetting device. Specifically, a monolithic sintered metal structure further allows for a very compact design even with curved channels inside the heat storage block. It may be produced by an additive manufacturing technology, such as e.g. laser sintering of a metal powder. This embodiment provides a heat storage block with high specific heat capacity in combination with high thermal conductivity.

In one embodiment of the pipetting device according to the invention, which may be combined with any of the preaddressed embodiments and any of the embodiments still to be addressed unless in contradiction, the flow restriction is formed by an inner wall of the heat storage block and the inner wall is the wall of at least a section of a through hole through the heat storage block, in particular of a through hole formed by mechanical drilling, formed by laser drilling or formed by an additive manufacturing method.

This embodiment implements the first alternative for establishing a flow restriction in a heat storage block as discussed above. The flow restriction may be formed by the complete through hole along its full length across the heat storage block. The flow restriction may be formed by a narrow section of a through hole across the heat storage block. In the latter case, sections of the through hole upstream or downstream of the fluid restriction may have larger cross-section, such that the narrow section mainly determines the flow resistance of a fluid flowing through the through hole.

In one embodiment of the pipetting device according to the invention, which may be combined with any of the preaddressed embodiments and any of the embodiments still to be addressed unless in contradiction, the flow restriction is formed by a flow restriction element embedded in the heat storage block, wherein a wall of the flow restriction element consists of a first material having a first specific thermal conductivity, wherein the heat storage block consists of a second material having a second specific thermal conductivity, and wherein the second specific thermal conductivity is higher than the first specific thermal conductivity.

This embodiment implements the first alternative for establishing a flow restriction in a heat storage block as discussed above. In this alternative, the flow restriction element is an element different from the heat storage block and consists of a material different from the material of the heat storage block. The wall of the flow restriction element or the complete flow restriction element may e.g. consist of glass, such as e.g. fused silica. The first thermal conductivity may then be in the range of 0.1 $Wm^{-1}K^{-1}$ to 10 $Wm^{-1}K^{-1}$. The second specific thermal conductivity may be in the range of 10 $Wm^{-1}K^{-1}$ to 1000 $Wm^{-1}K^{-1}$, in particular in the range of 100 $Wm^{-1}K^{-1}$ to 1000 $Wm^{-1}K^{-1}$. To achieve this, the heat storage block may e.g. be made of a metal or a metal alloy, such as stainless steel, copper or bronze. The values of the specific thermal conductivities given above are for 25° C. The material of the flow restriction element may be selected such that a processing method may be applicable to the flow restriction element, which is not applicable to the heat storage block directly.

In one embodiment of the pipetting device according to the invention, which may be combined with any of the preaddressed embodiments and any of the embodiments still to be addressed unless in contradiction, the flow restriction element is formed as a tubular capillary, in particular a glass capillary, in particular made from fused silica. The tubular capillary extends through a cavity formed in the heat storage block.

Pulling a tubular capillary is a processing method applicable to glass, in particular to fused silica, and leads to precisely controllable inner diameters even at small inner diameters in the range below 0.5 mm, in particular below 0.2 mm. In this diameter range, mechanical drilling is not precise enough. As the inventors have recognized, the combination of features of this embodiment solves the problem of reproducibly producing a fluid restriction of small cross-section with high precision and at the same time avoiding negative impact on pipetting precision via temperature variations of the gaseous working medium.

In an example of the previously discussed embodiment, an inner surface of the cavity is arranged such that thermal radiation can be exchanged with an outer surface of the tubular capillary. Alternatively, or in combination with the previous example, an inner surface of the cavity is in thermally conducting contact with an outer surface of the tubular capillary. Alternatively, or in combination with one of the previous examples, the cavity is partially or completely filled with a material having a specific thermal conductivity of at least the specific thermal conductivity of said tubular capillary. In particular, the cavity may be filled with thermally conducting glue.

The exchange of thermal radiation may e.g. simply take place across a volume containing air. This volume may be free of obstacles for thermal radiation, such as solid elements. The inner wall of the cavity may surround the outer surface of the tubular capillary in all direction or nearly all direction. The tubular capillary may be glued to the heat storage block. The glue provides thermal conducting contact in addition to the possibility of exchange of thermal radiation. The glue may further provide a fluid tight gasket.

As another example, the cavity may be partially or completely filled with a glue, in particular with a glue having high thermal conductivity. A glue having high thermal conductivity is, as an example, an epoxy with one of the following fillers: aluminum oxide, aluminum nitride, silver or graphite.

The inventors have recognized that the accuracy and precision with this embodiment are particularly high. In this embodiment, the temperature of the flow restriction tends to stay close to the temperature of the heat storage block.

In one embodiment of the pipetting device according to the invention, which may be combined with any of the preaddressed embodiments and any of the embodiments still to be addressed unless in contradiction, the pipetting device comprises a multiplicity of connection openings, the pipetting device comprises a multiplicity of gas flow connections between each of said connection openings and the at least one pressure source, and the pipetting device comprises a multiplicity of flow restrictions each defining at least a section of one of said gas flow connections of said multiplicity of gas flow connections. All of the flow restrictions of said multiplicity of flow restrictions are embedded in the heat storage block.

In one embodiment of the pipetting device according to the invention, which may be combined with any of the preaddressed embodiments and any of the embodiments still to be addressed unless in contradiction, the heat storage block further accommodates at least an electrically operated valve, in particular a controllable valve of the embodiments comprising at least a controllable valve.

The inventors have recognized that surprisingly, high precision and accuracy of the pipetted volumes can be achieved, when electrically operated valves of the pipetting device are accommodated in the heat storage block. This is surprising, as electrically operated valves are a source of temperature drift, as their temperature increases with the number switching operations. In addition, the longer electrically operated valves are open, i.e. the larger the volumes to be pipetted are, the more heat is produced. Typically, opening of the valve is associated with a current flowing through a magnetic coil in the valve, which current produces heat, whereas the valve is closed by a spring element, such that no heat is produced in the closed state of the valve. Bringing the electrically operated valve in close proximity of the flow restriction reduces dead volumes in the path of the gaseous working fluid. Surprisingly, a negative side effect on precision and accuracy of the pipetted volumes due to temperature drift induced by the electrically operated valves is avoided by the means proposed by the present invention. High thermal conductivity of the heat storage block and high heat capacity of the heat storage block are beneficial, as both properties stabilize the temperature of the heat storage block. Increasing the specific heat capacity of the material of the heat storage block or the mass of the heat storage block, or both, increases the heat capacity of the heat storage block.

The invention is further directed to a gas flow connection element according to claim 11. The gas flow connection element according to the invention is a gas flow element for a pipetting device according to embodiments of the invention, which comprise a heat storage, and wherein the first sensor is a temperature sensor thermally connected to the heat storage block. It combines essential features of these embodiments in a single element, which may be provided as an exchangeable spare part for a pipetting device.

The gas flow element comprises the flow restriction.

The gas flow element comprises the heat storage block into which the flow restriction is embedded or wherein the flow restriction is formed by an inner wall of the heat storage block.

The gas flow element comprises the temperature sensor being thermally connected to the heat storage block and/or to the flow restriction.

Further in the scope of the invention lies a method of pipetting a liquid volume of a liquid according to claim 12. The inventive method is a method of pipetting a liquid volume of a liquid by driving said liquid by means of a gaseous working medium. The method comprises the steps of a) providing a pipetting device according to the invention;

b) defining a volume of liquid to be pipetted and defining whether pipetting is aspirating or dispensing;

c) reading a value from the first sensor;

d) determining a temperature of the flow restriction as function of at least the value read from the first sensor;

e) determining at least one pipetting parameter as a function of the volume of liquid to be pipetted and of the temperature determined in step d);

f) operating the pipetting device by applying the at least one pipetting parameter determined in step e), which operating involves flowing of an amount of the gaseous working medium across the flow restriction, thereby pipetting the liquid volume.

The method makes best use of the pipetting device according to the invention.

Variants of the method are defined by features recited in claims 13 to 15.

In one variant of the method according to the invention, which may be combined with any of the variants still to be addressed unless in contradiction, the pipetting device used in the method is a pipetting device according an embodiment, which further comprises a time controller operatively connected to a controllable valve, which controllable valve is configured to selectively open or interrupt said gas flow connection in a time-controlled manner. According to this variant of the method, at least one pipetting parameter determined in step e) is an opening time of the controllable valve, and operating the pipetting device comprises the partial steps f1) starting pipetting of the liquid volume by opening the at least one valve during the opening time determined in step e); and f2) closing the controllable valve after the opening time has elapsed.

In one variant of the method according to the invention, which may be combined with any of the variants involving an opening time of a controllable valve, the opening time is controlled by open-loop control.

This variant of the method is particularly suitable to achieve very small volumes of pipetted liquid.

In a further variant of the method according to the invention, which may be combined with any of the variants involving an opening time of a controllable valve, the opening time is determined further in function of at least one of an ambient temperature, an ambient pressure, calibration data indicative for a switching time of the controllable valve, a parameter or a set of parameters defining a geometric property of the flow restriction, in particular a cross section area of the flow restriction, a length of the flow restriction, or a flow resistance of the flow restriction for a fluid having a defined viscosity, a temperature dependence of the viscosity of the gaseous working medium.

Further parameters in addition to the quantity indicative of the temperature of the flow restriction, which can be measured by the first sensor of the pipetting device, may be used as input in a computational model simulating the behavior of the gaseous working medium in the flow restriction. The computational model may e.g. be run on a microprocessor used for control of the pipetting device. With this, the volume of gaseous working medium passing the flow restriction per time may be predicted even with higher precision. The parameter or a set of parameters defining a geometric property of the flow restriction may for example be determined in a calibration procedure, wherein the volume flow through a flow restriction to be calibrated is compared a volume flow through a volume flowing through a flow restriction standard under equal conditions.

The invention shall now be further exemplified with the help of figures. The figures show:

Figure 4A:
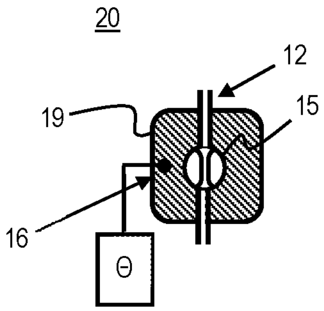
Figure 4B:
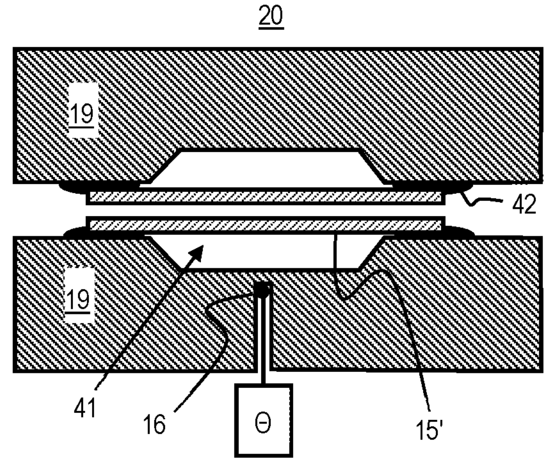
Figure 4C:
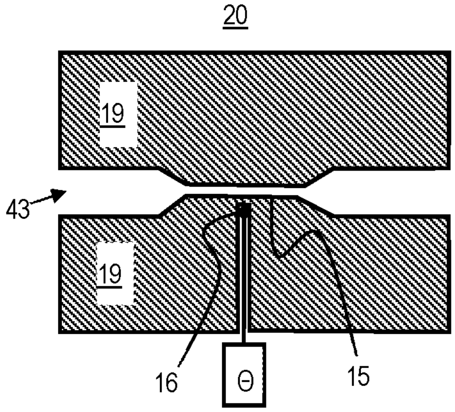
Figure 4D:
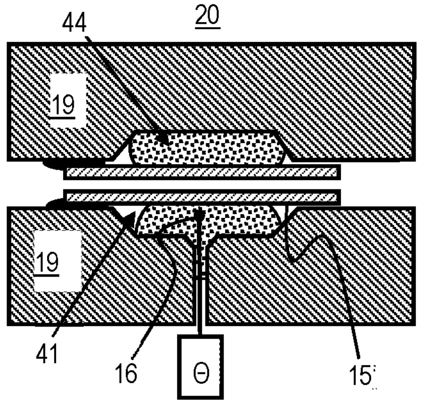
Figure 5:
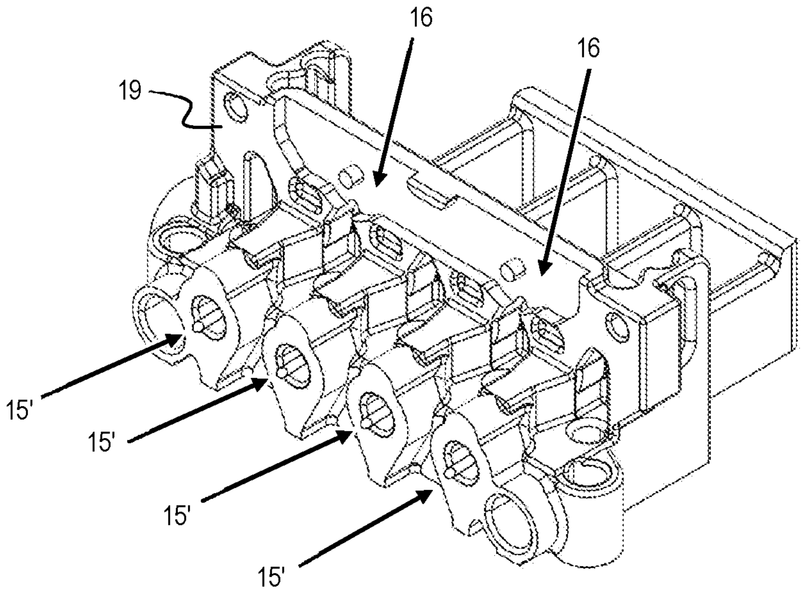
Figure 6:
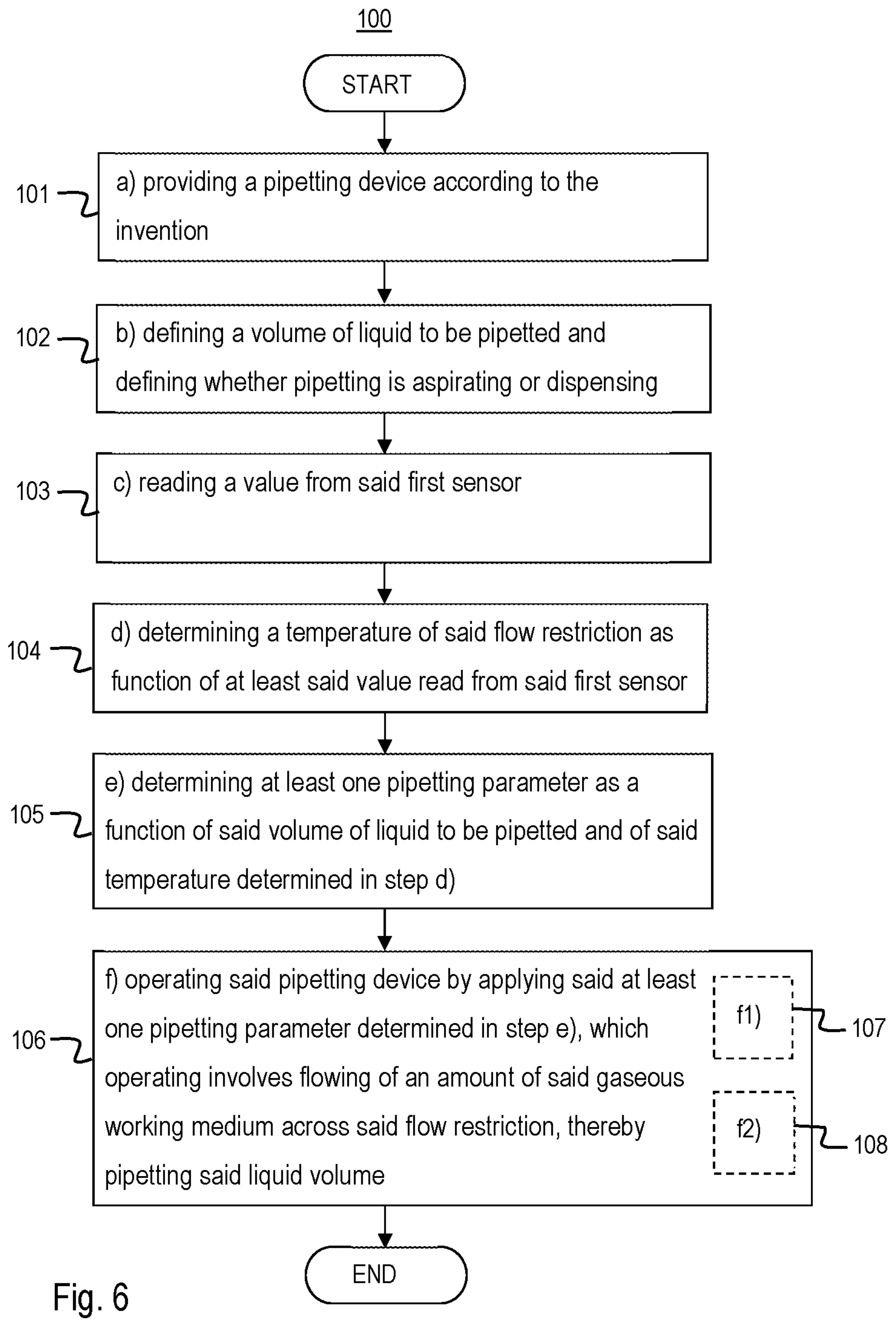

FIG. 4*a* shows a schematic view of a gas flow connection element according to the invention;

FIG. 4*b*, FIG. 4*c*, FIG. 4*d* each show a cross-section through different examples of an embodiment of the gas flow element;

FIG. 5 shows a perspective view of a heat storage block;

FIG. 6 shows a flow chart of the method of pipetting a liquid volume of a liquid according to the invention.

Figure 1:
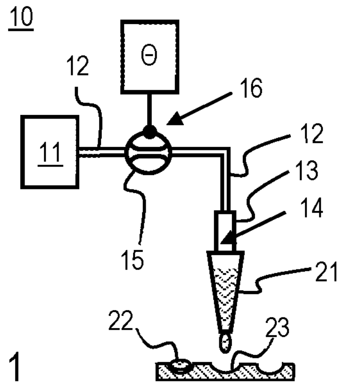
FIG. 1 shows a schematic view of the pipetting device according to the invention.

FIG. 1 shows schematically and simplified, a pipetting device 10 according to the invention. To illustrate its functionality, the present view shows in addition to the pipetting device itself some further elements in a specific pipetting situation. The pipetting device is shown with a pipette 21 attached to the connection opening 14 of the pipette connector 13. The pipette shown in this view contains a liquid, which at the moment is set under pressure by a gaseous working volume entering through the connection opening 14 into the pipette 21. A drop of liquid is pushed out of an opening of the pipette opposite to the opening of the pipette, which is in connection with the connection opening of the pipetting device. A previously produced liquid volume 22 is situated in one of the wells 23 of a well plate arranged below the pipette tip.

The gaseous working medium is pressurized by the pressure source 11. A gas flow connection leads from the pressure source 11 across a flow restriction 15 to the pipette connector and thus establishes connection from the pressure source 11 to the connection opening 14, through which the gaseous working medium can flow. A first sensor 16 is configured to measure a quantity indicative of the temperature θ of the flow restriction. The first sensor 16 is in close proximity of the flow restriction 15. A measuring device and possible a calculation device may be operatively connected to the first sensor 16.

Figure 2:
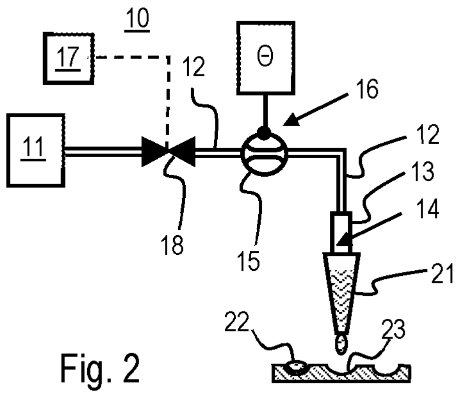
FIG. 2 shows a schematic view of an embodiment of the pipetting device.

FIG. 2 shows a schematic view of an embodiment of the pipetting device. In addition to the elements already discussed in the context of FIG. 1, this embodiment comprises a controllable valve 18. The controllable valve 18 is operatively connected to a time controller 17, wherein the operative connection is indicated by a dashed line. The controllable valve is arranged in the gas flow connection, in the example shown here in the upstream part of the gas flow connection with respect to the flow restriction. The controllable valve 18 is configured to selectively open or interrupt the gas flow connection 12 in a time-controlled manner. The controllable valve may e.g. be a magnetic valve, which is normally held in a closed state by means of a spring and can be opened by applying an electric current to a coil, the timing of the electrical current being controlled by the time controller 17. In this example, the operative connection between the time controller 17 and the controllable valve may be provided by a pair of electrically conducting wires.

Figure 3:
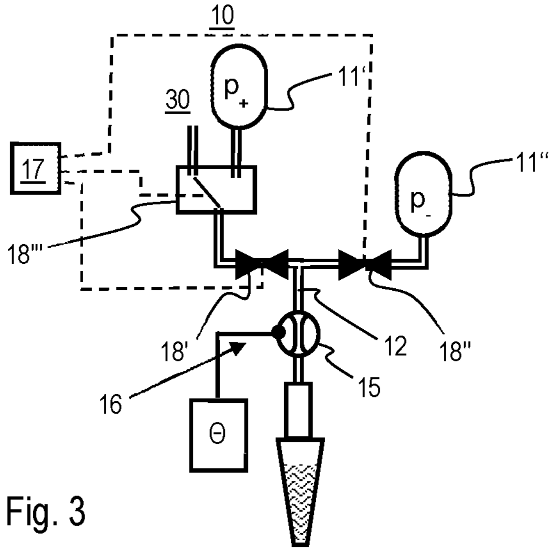
FIG. 3 shows a schematic view of a further embodiment of the pipetting device.

FIG. 3 shows a schematic view of a further embodiment of the pipetting device. The pipetting device shown here comprises a positive pressure source 11' and a negative pressure source 11", each of which is built as pressure tank. The flow connection 12 to the pipette connector branches into two arms, one leading to the positive pressure source, the other leading to the negative pressure source. The branching is in the upstream section with respect to the flow restriction 15. A two-way valve 18' and a two-way valve 18" are provided in each of the two arms. A third valve, being a switching valve 18'" allows to selectively connect the first arm of the flow connection to either the positive pressure source 11' or to reference pressure 30, e.g. atmosphere pressure. All three valves 18', 18", 18'" mentioned above are operatively connected to a time controller 17, as indicated by dashed lines. The first two-way valve 18' and the switching valve 18" in combination form a controllable discharge valve arrangement. The first two-way valve 18' and the second two-way valve 18" are both controllable valves being configured to selectively open or interrupt said gas flow connection 12 in a time-controlled manner. The flow restriction 15 is arranged in the flow connection 12. A first sensor 16 is configured to measure a quantity indicative of the temperature of the flow restriction 15.

In partial FIG. 4*a* a schematic view of a gas flow connection element 20 according to the invention and in partial FIGS. 4*b*, 4*c* and 4*d* cross-sections through possible realization of the gas flow connection element 20 shown schematically in FIG. 4*a*. The gas flow connection element

20 comprises a heat storage block 19, into which the flow restriction 15 is embedded. All partial FIGS. 4*a* to 4*d* show embodiments comprising a heat storage block 19, such that the elements shown in these partial figures may be seen as the respective part of a pipetting device according to one of the above-mentioned embodiments comprising a heat storage block. A first sensor 16, which in this case is a temperature sensor, is thermally connected to the heat storage block 19. A first section of the gas flow connection 12 is shown immediately adjacent to the flow restriction 15 in FIG. 4*a*. These sections may be coupled in a releasable way to further sections of the gas flow connection 12 in a complete pipetting device. In the embodiment shown in FIG. 4*b* a cavity 41 is formed into the heat storage block 19. Tubular capillary extends across the cavity and is glued at opposite ends to the heat storage block. Glue 42 provides thermally conducting contact between an outer surface of the tubular capillary and the heat storage block and further seals a gap between the heat storage block and the tubular capillary, such that gas flow is forced through the narrow inner bore of the capillary forming the flow restriction element 15'. The inner surface of the cavity 41 is arranged around the capillary and without radiation blocking elements between them, such that thermal radiation can be exchanged between an outer surface of the tubular capillary and the inner surface of the cavity. The first sensor 16 being a temperature sensor is positioned at the end of a blind hole formed into the heat storage block at a position closer to the inner walls of the cavity than to an outer surface of the heat storage element. The heat storage element may e.g. comprise metal or may be made of metal.

In the example embodiment shown in FIG. 4*c*, there is no separate flow restriction element, but the flow restriction 15 is rather formed by an inner wall of the heat storage block. A middle section of the through hole 43 is narrower than an inlet and an outlet section of the through hole and forms the flow restriction. A temperature sensor 16 is mounted in close proximity of the section forming the flow restriction 15. In the further example embodiment shown in FIG. 4*d*, a flow restriction element in the form of a capillary is present. The flow restriction element 15' is embedded in a cavity 41, which is partially filled with a thermally conductive glue 44. A temperature sensor 16 is embedded in the thermally conductive glue 44 and sits in close proximity to the flow restriction element 15'. In the embodiment shown, the distance from the temperature sensor 16 to the capillary is less than the diameter of the capillary. As illustrated at the left end of the capillary, an additional sealing element may be arranged between the capillary and the heat storage element 19 in order to insure that the gaseous working medium flows through the flow restriction element 15', which in this case has the form of a capillary.

FIG. 5 shows a perspective view of an embodiment of a heat storage block 19. The heat storage block shown provides through holes for accommodating four flow restriction elements 15'. The four flow restriction elements 15' are shown in a position offset in the axial direction towards the openings visible in the current view. In their finally mounted position, the flow restriction elements 15' may not be visible from the viewpoint used in this figure. The final mounting position of the restriction elements may correspond to the situations illustrated in FIG. 4*b* or 4*d*, such that the flow restriction elements are well protected by the surrounding heat storage block. Two arrows indicate possible positions of two temperature sensors 16. The temperature sensors may e.g. be mounted on a printed circuit board, which may be arranged on a surface of the heat storage block. The embodiment of the heat storage block shown here provides structures for holding a printed circuit board, which is not shown, in place. Two temperature sensors allow to determine a mean temperature of the heat storage block as well as to detect the presence of a temperature gradient across the heat storage block. With this sensor configuration, the temperature of each of the four flow restriction elements 15' can be determined with even higher precision. The temperature sensors and possibly further sensor, as e.g. pressure sensors or differential pressure sensor may be arranged on a print, for which a cutout is foreseen. A heat storage block with complicated geometry as shown here may be produced as a monolithic sintered metal structure, e.g. by laser sintering a metal powder or a similar additive production method. These production methods allow for non-straight holes inside the heat storage block. The inventors have recognized that such an arrangement leads to a very compact design and very little dead volumes in the gas flow connection element 20 and in the pipetting device 10 according to the invention.

FIG. 6 shows a flow chart of the method 100 of pipetting a liquid volume of a liquid. Begin and end of the method are marked with START and END. In the variant of the method shown in this figure, steps 101 to 106 corresponding to the steps a) to f) are executed one after the other, step 101 being the first step and step 106 being the last step. According to the inventive method, some of the steps may overlap or partially overlap in time. Steps which do not depend on the result of another step may be executed in a different order, e.g. step b) (step 102) and step c) (step 103) may be exchanged, as reading a value from said first sensor 16 is independent of the defining of a volume to be pipetted. Step c) may even be performed continuously in parallel to the other steps of the method. In a specific variant of the method, wherein the at least one pipetting parameter determined in step e) is an opening time $\Delta t$ of the controllable valve, the last step 106 comprises partial steps 107 and 108 denoted as f1) and f2), namely f1) starting 107 pipetting of the liquid volume by opening said at least one valve during the opening time determined in step e); and f2) closing 108 the controllable valve after the opening time $\Delta t$ has elapsed.

LIST OF REFERENCE SIGNS

10 pipetting device
11 pressure source
11' pressurizing pressure source
11" suctioning pressure source
12 gas flow connection
13 pipette connector
14 connection opening
15 flow restriction
15' flow restriction element
16 first sensor
17 time controller
18, 18', 18", 18'" controllable valve
19 heat storage block
20 gas flow connection element
21 pipette
22 liquid volume
23 well
30 reference pressure
41 cavity (formed in the heat storage block)
42 glue
43 through hole
44 thermally conductive glue 100 method of pipetting a liquid volume
101 step a) of the method
102 step b) of the method
103 step c) of the method
104 step d) of the method
105 step e) of the method
106 step f) of the method
107 partial step f1)
108 partial step f2)
p+ positive pressure
p− negative pressure
Δt opening time of controllable valve
θ temperature of the flow restriction
$\theta_a$ ambient temperature
$p_a$ ambient pressure
η viscosity of gaseous working medium

The invention claimed is:

1. Pipetting device (10) for pipetting a liquid driven by a gaseous working medium, the pipetting device comprising:

at least one pipette connector (13) adapted to attach a pipette (21) at a connection opening (14), at least one pressurizing and/or suctioning pressure source (11, 11', 11"), a gas flow connection (12) between said connection opening and said at least one pressurizing and/or suctioning pressure source (11, 11', 11"), a flow restriction (15) defining at least a section of said gas flow connection, a first sensor (16) configured to measure a quantity indicative of the temperature of the flow restriction, a heat storage block (19), wherein the flow restriction (15) is formed by an inner wall of the heat storage block or wherein the flow restriction (15) is formed by a flow restriction element (15') embedded in the heat storage block, and wherein said first sensor (16) is a temperature sensor thermally connected to said heat storage block.

2. Pipetting device (10) according to claim 1, further comprising a time controller (17) operatively connected to a controllable valve (18, 18', 18", 18"), which controllable valve is configured to selectively open or interrupt said gas flow connection (12) in a time-controlled manner.

3. Pipetting device (10) according to claim 1, wherein said heat storage block (19) comprises a metal.

4. Pipetting device (10) according to claim 1, wherein the flow restriction (15) is formed by inner wall of the heat storage block and wherein said inner wall is the wall of at least a section of a through hole through the heat storage block formed by laser drilling or formed by an additive manufacturing method.

5. Pipetting device (10) according to claim 1, said pipetting device comprising a multiplicity of connection openings (14), a multiplicity of gas flow connections (12) between each of said connection openings and said at least one pressure source (11, 11', 11"), and a multiplicity of flow restrictions (15) each defining at least a section of one of said gas flow connections of said multiplicity of gas flow connections, wherein all of said flow restrictions (15) of said multiplicity of flow restrictions are embedded in said heat storage block (19).

6. Pipetting device (10) according to claim 1, wherein an electrically operated valve is accommodated in the heat storage block.

7. Gas flow connection element (20) for a pipetting device (10) according to claim 1, said gas flow connection element comprising:

said flow restriction (15), said heat storage block (19), and said temperature sensor (16) being thermally connected to said heat storage block and/or to said flow restriction.

8. Method (100) of pipetting a liquid volume (22) of a liquid by driving said liquid by means of a gaseous working medium, said method comprising the steps of a) providing (101) pipetting device according to claim 1;

b) defining (102) a volume of liquid to be pipetted and defining whether pipetting is aspirating or dispensing;

c) reading (103) a value from said first sensor (16);

d) determining (104) a temperature of said flow restriction (15) as function of at least said value read from said first sensor (16);

e) determining (105) at least one pipetting parameter as a function of said volume of liquid to be pipetted and of said temperature determined in step d);

f) operating (106) said pipetting device by applying said at least one pipetting parameter determined in step e), which operating involves flowing of an amount of said gaseous working medium across said flow restriction (15), thereby pipetting said liquid volume.

9. Method (100) according to claim 8, wherein said pipetting device (10) is a pipetting device, wherein said at least one pipetting parameter determined in step e) is an opening time (Δt) of a controllable valve, and wherein operating said pipetting device comprises partial steps f1) starting (107) pipetting of said liquid volume by opening said at least one valve during said opening time determined in step e); and f2) closing (108) said controllable valve after said opening time (Δt) has elapsed.

10. Method according to claim 9, wherein said opening time (Δt) is controlled by open-loop control.

11. Method according to claim 9, wherein said opening time (Δt) is determined further in function of at least one of an ambient temperature ($\theta_a$), an ambient pressure ($p_a$), calibration data indicative for a switching time of said controllable valve, a parameter or a set of parameters defining a geometric property of the flow restriction for a fluid having a defined viscosity, a temperature dependence of the viscosity of said gaseous working medium.

12. Pipetting device (10) according to claim 1, wherein said heat storage block (19) comprises sintered metal.

13. Pipetting device (10) according to claim 1, wherein said heat storage block (19) consists of a monolithic sintered metal structure.

14. Pipetting device (10) according to claim 1, wherein said first sensor (16) is positioned at the end of a blind hole formed into the heat storage block at a position closer to the inner wall thereof or to the flow restriction element (15') therein than to an outer surface of the heat storage element.

15. Pipetting device (10) for pipetting a liquid driven by a gaseous working medium, the pipetting device comprising:

at least one pipette connector (13) adapted to attach a pipette (21) at a connection opening (14), at least one pressurizing and/or suctioning pressure source (11, 11', 11"), a gas flow connection (12) between said connection opening and said at least one pressurizing and/or suctioning pressure source (11, 11', 11"), a flow restriction (15) defining at least a section of said gas flow connection, a first sensor (16) configured to measure a quantity indicative of the temperature of the flow restriction, a heat storage block (19), wherein the flow restriction (15) is formed by a flow restriction element (15') embedded in the heat storage block, wherein said first sensor (16) is a temperature sensor thermally connected to said heat storage block, and wherein a wall of said flow restriction element (15') consists of a first material having a first specific thermal conductivity, wherein said heat storage block (19) consists of a second material having a second specific thermal conductivity, and wherein said second specific thermal conductivity is higher than said first specific thermal conductivity.

16. Pipetting device (10) according to claim 15, wherein said flow restriction element (15') is formed as a tubular capillary, which tubular capillary extends through a cavity (41) formed in said heat storage block (19).

17. Pipetting device (10) according to claim 16, wherein an inner surface of said cavity is arranged such that thermal radiation can be exchanged with an outer surface of said tubular capillary and/or wherein an inner surface of said cavity is in thermally conducting contact with an outer surface of said tubular capillary and/or wherein said cavity is partially or completely filled with a material having a specific thermal conductivity of at least the specific thermal conductivity of said tubular capillary.

18. Pipetting device (10) according to claim 15, wherein said first sensor (16) is positioned at the end of a blind hole formed into the heat storage block at a position closer to the flow restriction element (15') therein than to an outer surface of the heat storage element.

19. Pipetting device (10) for pipetting a liquid driven by a gaseous working medium, the pipetting device comprising:

at least one pipette connector (13) adapted to attach a pipette (21) at a connection opening (14), at least one pressurizing and/or suctioning pressure source (11, 11', 11"), a gas flow connection (12) between said connection opening and said at least one pressurizing and/or suctioning pressure source (11, 11', 11"), a flow restriction (15) defining at least a section of said gas flow connection, a first sensor (16) configured to measure a quantity indicative of the temperature of the flow restriction, a heat storage block (19), wherein the flow restriction (15) is formed by an inner wall of the heat storage block, the flow restriction (15) being formed as a through hole in the heat storage block (19), the through hole forming three separate sections, an inlet section, a middle section and an outlet section, the middle section of the through hole being narrower than the inlet section and the outlet section thereof, and wherein said first sensor (16) is a temperature sensor thermally connected to said heat storage block.

20. Pipetting device (10) according to claim 19, wherein said first sensor (16) is positioned at the end of a blind hole formed into the heat storage block at a position closer to the flow restriction element (15') therein than to an outer surface of the heat storage element.

* * * * *